United States Patent
Kagaya

(10) Patent No.: US 6,982,809 B2
(45) Date of Patent: Jan. 3, 2006

(54) PHOTOGRAPHIC PRINTING SYSTEM

(75) Inventor: Makoto Kagaya, Kaisei-machi (JP)

(73) Assignee: Fuji Photo Film Co., Ltd, Kanagawa-ken (JP)

( * ) Notice: Subject to any disclaimer, the term of this patent is extended or adjusted under 35 U.S.C. 154(b) by 898 days.

(21) Appl. No.: 09/757,646

(22) Filed: Jan. 11, 2001

(65) Prior Publication Data

US 2001/0007504 A1 Jul. 12, 2001

(30) Foreign Application Priority Data

Jan. 11, 2000 (JP) ........................................ 2000-002608
Dec. 18, 2000 (JP) ........................................ 2000-383857

(51) Int. Cl.
*G06F 15/00* (2006.01)

(52) U.S. Cl. .................... 358/1.18; 358/1.17; 358/1.16; 358/1.15; 358/296

(58) Field of Classification Search ................ 358/1.18, 358/1.17, 1.16, 1.15, 1.11, 1.1, 296, 450, 358/540; 101/483; 396/310, 300; 707/527, 707/530
See application file for complete search history.

(56) References Cited

U.S. PATENT DOCUMENTS 5,778,164 A  *  7/1998  Watkins et al. ............ 358/1.18
6,185,000 B1     2/2001  Shiota et al. .............. 358/1.18

FOREIGN PATENT DOCUMENTS

EP       A2851661       7/1998

\* cited by examiner

*Primary Examiner*—Twyler M. Lamb
(74) *Attorney, Agent, or Firm*—Birch, Stewart, Kolasch & Birch, LLP

(57) ABSTRACT

In a printing system for printing image data based on an order from a client, a character and/or a simple image desired by a user can be printed on a print. The user describes the content of the order in order information and transfers the order information to a laboratory when he/she orders printing of the image data. At this time, the character and/or the simple image to be printed on the print is described as character image information in the order information. The laboratory prints the image data based on the order information and prints the character and/or the simple image on the back of the print or on a white fringe or the like, based on the character image information described in the order information.

26 Claims, 11 Drawing Sheets

FIG.3

ORDER CONTENT

FILE NAME : File 001.jpg
QUANTITY : 5
PRINT SIZE : L
GLOSSY OR
NON-GLOSSY : GLOSSY
CHARACTER
INFORMATION : <GOOD MORNING>
<GOOD MORNING>
<GOOD MORNING>
<HELLO>
<HELLO>
PRINTING
POSITION : ON THE BACK
·
·
·

FIG.4

```
ORDER CONTENT

FILE NAME      : File 001.jpg
QUANTITY       : 5
PRINT SIZE     : L
GLOSSY OR
NON-GLOSSY     : GLOSSY
CHARACTER
INFORMATION    : <GOOD MORNING> ×5
PRINTING
POSITION       : ON THE BACK
```

FIG.5

ORDER CONTENT

FILE NAME : File 001.jpg

QUANTITY : 5

PRINT SIZE : L

GLOSSY OR
NON-GLOSSY : GLOSSY

CHARACTER
INFORMATION : <Mr. A>
              <Mr. B>
              <Mr. D>
              <Mr. E>
              <Mr. F>

PRINTING
POSITION : ON THE BACK

FIG.10

| ORDER CONTENT | |
|---|---|
| FILE NAME | : File 001.jpg |
| QUANTITY | : 5 |
| PRINT SIZE | : L |
| GLOSSY OR NON-GLOSSY | : GLOSSY |
| CHARACTER INFORMATION OR IMAGE INFORMATION | : 0 × 0 0 A |
| PRINTING POSITION | : ON THE BACK |

FIG.11

ORDER CONTENT

| | |
|---|---|
| FILE NAME | : File 001.jpg |
| | File 002.jpg |
| | File 004.jpg |
| | File 007.jpg |
| | File 008.jpg |
| QUANTITY | : 1 |
| PRINT SIZE | : L |
| GLOSSY OR NON-GLOSSY | : GLOSSY |
| CHARACTER INFORMATION | : <HELLO> |
| PRINTING POSITION | : ON THE BACK |

PHOTOGRAPHIC PRINTING SYSTEM

BACKGROUND OF THE INVENTION

1. Field of the Invention

The present invention relates to a photographic printing system for printing photographic image data obtained by digital cameras or the like.

2. Description of the Related Art

There has been known a digital photographic service system carrying out various digital photographic services related to photographs, such as storing photograph images obtained by users in image servers after digitization thereof, providing the images to the users by recording the images in CD-R's, and receiving orders for additional prints. In such a system, a user installs dedicated viewer software for reproducing an image recorded in a CD-R in his/her personal computer, and reproduces the image. The user generates order information describing the content of an order by using an ordering function of the viewer software in the case of ordering additional prints. The user brings the order information and the CD-R to a DPE store and the DPE store provides the order information and the CD-R to a laboratory. In this manner, a photograph image that has been ordered is generated.

As one form of such digital photographic service systems, a network photographic service system has been proposed. In a network photographic service system, digital images of users are stored (registered) in a system of a service provider and a printing order or the like is received via a network such as the Internet.

In such a network photographic service system, in order to provide digital photographic services to users, a server computer having a scanner, a printer, and a large-capacity disc (hereinafter called an image server) is installed in a wholesale laboratory and photographs obtained by users are stored in the image server. By enabling the users to access the image server via a network, various kinds of services such as ordering an additional print, attaching a photograph image to an e-mail message, and download of photographic image data are provided. In such a service, a user accesses the image server by using predetermined application software installed in his/her personal computer and orders an additional print or the like. Meanwhile, in the laboratory, photographic processing such as generation of an additional print, a picture postcard, an album, and a composite image, and trimming is carried out on image data based on order information from the user. Data after the processing are transferred to the user or an e-mail message notifying completion of the processing is sent to the user, for example.

The "order information" herein referred to is information such as a processing number indicating the content of a service (such as generation of an additional print or a postcard), an image number specifying a photograph, a print size, the quantity of prints, a quality of printing paper (such as glossy or non-glossy), the thickness of the paper, the content of photographic processing, and trimming specification, for example.

Meanwhile, in APS (Advanced Photo System), photographing information such as the date of photographing is magnetically recorded on a film upon photographing and the magnetically recorded photographing information is added to digital image data as tag information thereof when the film is read to obtain the image data. In the case of a digital camera, when image data obtained by photographing are recorded in a memory thereof, photographing information is added to the image data. The photographing information added to the image data in the above manner is printed on the back of photographic prints or the like, and used for managing or ordering the prints. For printing such photographing information on photographic prints, a method of printing photographing information by specifying a printing format such as a position and a font has also been proposed (Japanese Unexamined Patent Publication No. 10(1998)-191021).

However, in the method described in Japanese Unexamined Patent Publication No. 10(1998)-191021, only photographing information added to image data at the time of photographing is printed and characters desired by a user are not printed in this method.

SUMMARY OF THE INVENTION

The present invention has been conceived based on consideration of the above problem. An object of the present invention is therefore to provide a printing system enabling printing of characters and images desired by a user.

A printing system of the present invention comprises:

a client having character image information generation means for generating character image information representing a desired character and/or a desired simple image by receiving an input of the character and/or the simple image; and a laboratory server having information printing means for printing the character and/or the simple image at a predetermined position on a print based on the character image information provided from the client, at the time of printing image data.

The "desired character" refers to characters a user wishes to print on the print when the user requests printing of the image data from the laboratory, and the character can be a single character or a character string. More specifically, the character refers to a comment on an image represented by the image data, an impression of the image, a message, and the name of a person to whom the print is provided, for example.

The "desired simple image" is an image the user wishes to print on the print at the time of requesting printing of the image data from the laboratory server. The simple image refers to an image which can be printed comparatively easily as characters, such as a monochrome image and an image comprising only an outline. More specifically, a simple pattern, a portrait of the user, and a mark for identifying the user can be used as the simple image.

The character image information may be provided to the laboratory server via a network or by being recoded in a recording medium such as an FD and a CD-R.

In the case where the client has the image data to be printed, the character image information is provided by being added to the image data. Adding the character image information to the image data refers to a state in which the image data and the character image information are inseparable. More specifically, in the case where the character image information represents a desired character, the character image information is added to the image data as tag information thereof, or united with the image data as text data. Alternatively, the character information may be included in order information describing the content of printing. In the case where the character image information represents a desired simple image, the character image information is unified with the image data as bit map data while information for identifying the bit map data is included in order information. Meanwhile, if the laboratory server has the image data to be printed, or if the image data are stored in a database or the like other than the client, the client provides only the character image information to the laboratory server.

"Printing at a predetermined position" refers to printing the character and/or the simple image on a portion of a print where the image is formed, or on the back thereof, or on a white fringe when the print has the white fringe. However, if the character is printed on the portion where the image is formed, the character is not easy to see and a portion of the image is lacked due to the character and/or the simple image. Therefore, in the present invention, it is preferable for the character and/or the simple image to be printed either on the back of a print or on a white fringe.

In the printing system of the present invention, it is preferable for the character image information generation means to describe the character image information in order information representing the content of a printing order of the image data. At the same time, it is also preferable for the information printing means in the printing system of the present invention to print the character and/or the simple image at the predetermined position of the print based on the order information.

The "order information" refers to information such as a processing number indicating the content of a service (such as generation of an additional print or a postcard), an image number specifying a photograph, a print size, the quantity of prints, a quality of printing paper (such as glossy or non-glossy), the thickness of the paper, the content of photographic processing, and trimming specification, for example.

In the case where the content of the printing order specifies generation of a plurality of prints of the same image data, it is preferable for the character image information generation means in the printing system of the present invention to enable setting the character image information for each of the prints. In this case, it is also preferable for the information printing means of the present invention to print the character and/or the simple image represented by the character image information set for each of the prints on the predetermined position of each of the prints.

"Setting the character image information for each of the prints" refers to setting the character image information representing a different character and/or a different simple image for each of the prints or setting one item of character image information to a plurality of the prints, upon setting the different characters and/or the different simple image.

Furthermore, in the case where the content of the printing order specifies printing of a plurality of sets of the image data, it is preferable for the character image information generating means in the printing system of the present invention to enable setting one item of the character image information for all prints. In this case, it is also preferable for the information printing means to print the character and/or the simple image represented by the character image information at the predetermined position of each of the prints.

It is preferable for the client and the laboratory server to comprise storage means for storing a table relating a predetermined character and/or a predetermined simple image to code information representing a kind of the character and/or the simple image. In this case, a desired character and/or a desired simple image are input as the code information and the code information that has been input is generated as the character image information. In this manner, in the case where a desired simple image is printed on a print, the character image information can be added to the image data as tag information thereof. Moreover, without using bit map data, only the order information can include the character image information.

A print order method of the present invention comprises the steps of:

generating character image information representing a desired character and/or a desired simple image by receiving an input of the character and/or the simple image; and printing the character and/or the simple image at a predetermined position of a print based on the character image information when image data are printed.

In the print order method of the present invention, it is preferable for the character image information to be described in order information representing the content of a printing order of the image data.

Furthermore, in the case where the content of the printing order specifies generation of a plurality of prints of the same image data, it is preferable for the character image information to be set for each of the prints.

Moreover, in the case where the content of the printing order specifies printing of a plurality of sets of the image data, it is preferable that one item of character image information is set for all the prints.

It is preferable for the desired character and/or the desired simple image to be input as code information representing a kind of a predetermined character and/or a predetermined simple image.

A print order apparatus of the present invention is an apparatus used in the print order method of the present invention, and the print order apparatus comprises:

character image information generation means for generating the character image information representing the desired character and/or the desired simple image by receiving the input of the character and/or the simple image.

A printing apparatus of the present invention is an apparatus used in the print order method of the present invention, and the printing apparatus comprises:

information printing means for printing the character and/or the simple image at the predetermined position of the print based on the character image information when the image data are printed.

The steps of the print order method of the present invention may be provided as a program recorded in a computer-readable recording medium to cause a computer to execute the method.

According to the present invention, the client receives the input of the desired character and/or the desired simple image, and the character image information representing the character and/or the simple image is generated and provided to the laboratory server. The laboratory server prints the character and/or the simple image at the predetermined position of the print based on the character image information when the image data are printed. In this manner, the print on which the desired character and/or the simple image such as a comment or a message regarding the print or a portrait of the user printed can be generated. By printing the desired character and/or the desired simple image on the print in the above manner, the user can easily refresh a memory of the print when looking at the print later. Therefore, the print can be managed easily.

Furthermore, by describing the character image information in the order information representing the content of the printing order of the image data, the user only has to input the character and/or the simple image in addition to an input of the quantity and the like, at the time of generating the order information. Therefore, the character image information can be generated efficiently. Meanwhile, the laboratory server knows the content of both the order and the character image information by simply referring to the order information. Therefore, printing can be carried out efficiently.

Moreover, by enabling setting the character image information for each of the prints when the same image data are printed a plurality of times, each of prints can have the name of a person to whom the print is provided, such as in the case where the same class photos are generated for each of persons in the photo. By printing each person's name in the above manner, the prints can be distributed easily.

In the case where a plurality of sets of the image data are printed, the identical character image information item can be set for all the prints. In this manner, input of a desired character and/or a desired simple image for each of the prints becomes unnecessary and the character image information can be generated easily.

By inputting the desired character and/or the desired simple image as the code information representing the kind of the predetermined character and/or the predetermined simple image, the desired character and/or the desired simple image can be input easily. In this case, the client and the laboratory server comprise the storage means for storing the table relating the character and/or the simple image to the code information corresponding to the character and/or the simple image. The client selects the desired character and/or the desired simple image from the talbe and inputs the code information corresponding to the selected character and/or the selected simple image.

The character image information generating means receives the code information and generates the code information as the character image information. The laboratory server receives the character image information and the information printing means prints the character and/or the simple image corresponding to the code information at the predetermined position, based on the code information represented as the character image information and based on the table.

By connecting the client to the laboratory server via a network, the character image information can be transferred from the client to the laboratory server, which leads to improvement of printing efficiency.

BRIEF DESCRIPTION OF THE DRAWINGS

FIG. 3 shows the content of an order described in order information (example 1);

FIG. 4 shows the content of an order described in order information (example 2);

FIG. 5 shows the content of an order described in order information (example 3)

FIG. 10 shows the content of an order described in the order information (example 4); and FIG. 11 shows the content of an order described in the order information (example 5).

DESCRIPTION OF THE PREDERRED EMBODIMENT

Hereinafter, an embodiment of the present invention will be explained.

Figure 1:
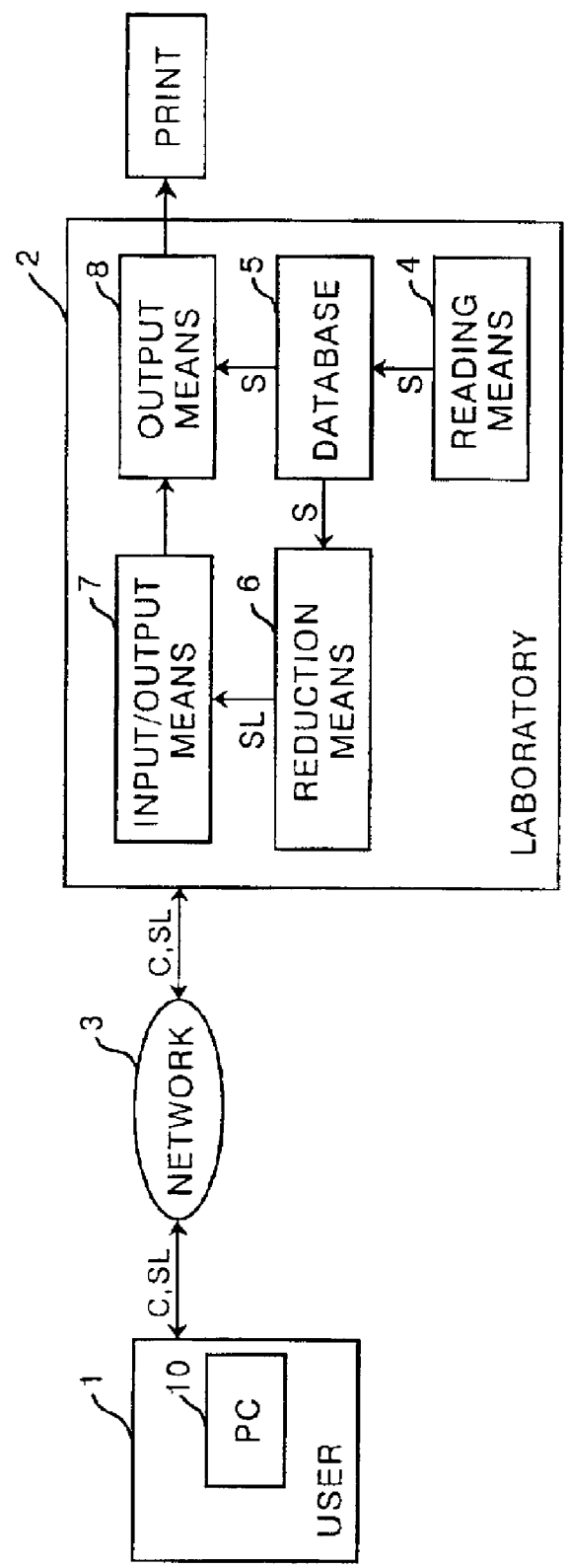
FIG. 1 is a block diagram showing a configuration of a printing system according to an embodiment of the present invention.

FIG. 1 is a block diagram showing a configuration of a printing system as the embodiment of the present invention. In the printing system shown in FIG. 1, a user 1 and a laboratory 2 are connected via a network 3, and data and a print are exchanged between the user 1 and the laboratory 2.

The user 1 has a personal computer 10 as a client and exchanges the data with the laboratory 2 via the network 3. The user 1 generates order information C by using the personal computer 10 and transfers the order information C to the laboratory 2. The order information C includes character information representing a character to be printed on a print, which will be explained later.

The laboratory 2 is a system for carrying out printing. The laboratory 2 comprises reading means 4 for obtaining high-resolution image data S by reading images from a film brought by the user 1, a database 5 for storing the image data S, reduction means 6 for generating low-resolution image data SL from the image data S, input/output means 7 for receiving the order information C from the user 1 and for transferring the low-resolution image data SL to the user 1, and output means 8 for carrying out printing based on the order information C and for printing the character on a print based on the character information included in the order information C. The user 1 may request printing directly from the laboratory 2, or via a DPE store dedicated to order reception.

Figure 2:
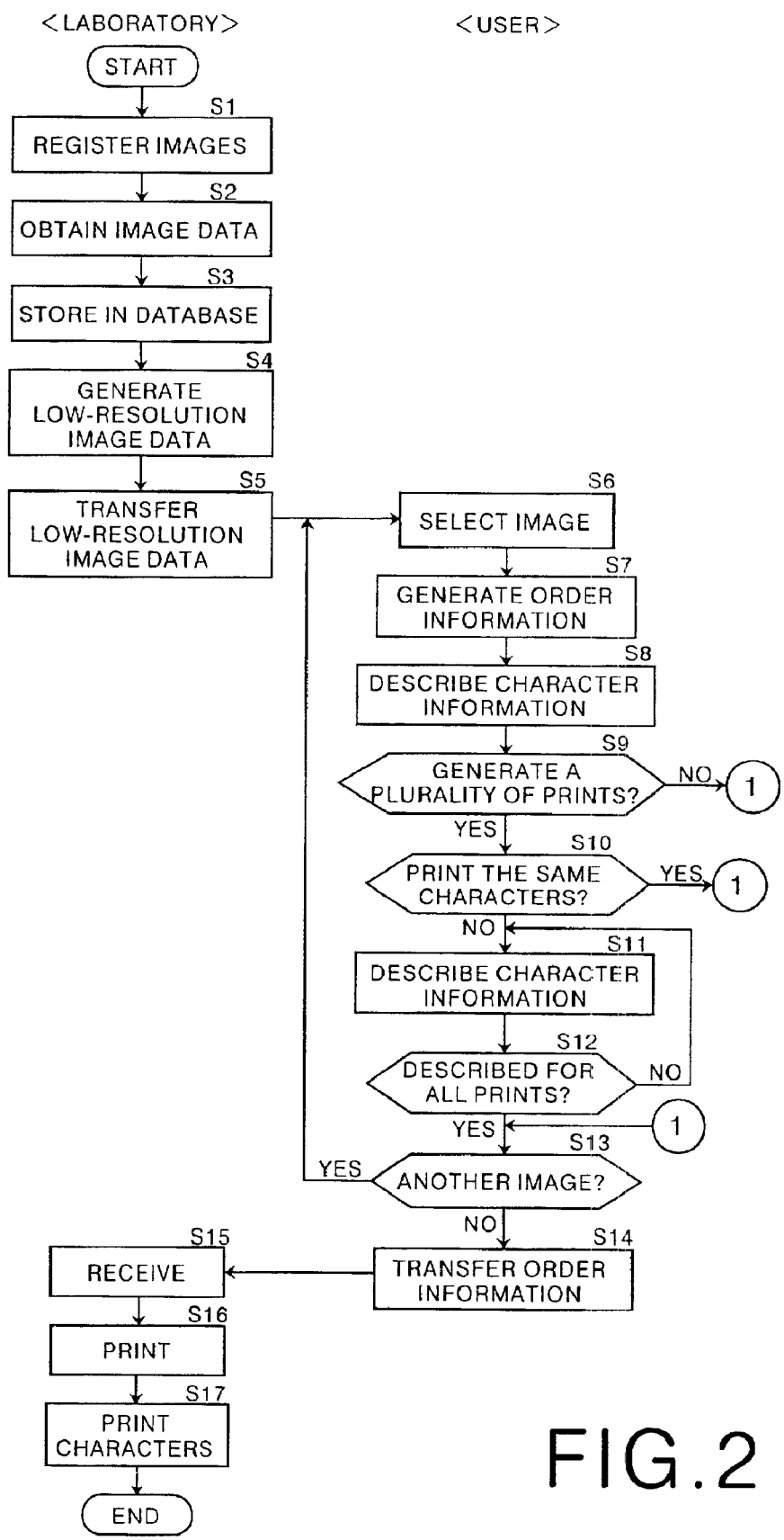
FIG. 2 is a flow chart showing processing in the embodiment.

Operation of this embodiment will be explained next. FIG. 2 is a flow chart showing the operation of this embodiment. First, the user 1 brings the DPE store or the laboratory 2 a negative film and registers images (Step S1). If the registration is carried out at the DPE store, the film is brought to the laboratory 2 from the DPE store. In the laboratory 2, the film from the user 1 or from the DPE store is read by the reading means 4 and the high-resolution image data S representing the images recorded on the film are obtained (Step S2). The high-resolution image data S are stored in the database 5 (Step S3). Meanwhile, the reduction means 6 generates the low-resolution image data SL whose resolution is lower than a resolution of the high-resolution image data S (Step S4). The low-resolution image data SL are transferred from the input/output means 7 to the user 1 via the network 3 (Step S5).

The user 1 displays the low-resolution image data SL on a monitor of the personal computer 10 and orders printing while confirming the images. The user 1 selects one of the images to be printed (Step S6), and generates the order information C describing a file name of the image data S to be printed, the quantity, a print size, preference of either glossy or non-glossy paper, and the like (Step S7). At this time, the user 1 inputs, to the personal computer 10, characters to be printed on a print. In this manner, the character information representing the characters to be printed is described in the order information C (Step S8). Whether a plurality of prints are generated for the same image is then judged based on the order information C (Step S9). If a result at Step S9 is affirmative, the user 1 is prompted to judge whether the same characters are printed on all the prints (Step S10).

If the result at Step S10 is negative, the user 1 is prompted to input different characters to be printed on the prints. The user 1 inputs the different characters, and the information of the different characters is described in the order information C (Step S11). Whether or not the character information for all the prints has been described in then judged (Step S12). If a result at Step S12 is negative, the procedure at Steps S11 and S12 is repeated until the result at Step S12 becomes affirmative after the character information for all the prints has been described. If the result at Step S12 is affirmative, the user 1 is prompted to judge whether another image to be printed exists (Step S13). When a result at Step S13 becomes affirmative, the procedure goes back to Step S6 and the procedure from Step S6 to Step S13 is repeated. If the result at Step S9 is negative and if the result at Step S10 is affirmative, the procedure goes to Step S13. When the result at Step S13 becomes negative, generation of the order information has been judged completed and the order information is transferred to the laboratory 2 (Step S14).

FIG. 3 shows the content of the order described in the order information C. As shown in FIG. 3, the order information C includes the character information representing the characters to be printed on the print and a position of the characters, in addition to the file name of the image to be printed, the quantity, the print size, and the preference of glossy or non-glossy paper. The order information C in FIG. 3 indicates "5" as the quantity. Therefore, five items of character information are described therein. The character information in FIG. 3 comprises three word strings "good morning" and two words "hello". In FIG. 3, the printing position is specified as "on the back". However, in the case where the order content describes a white fringe surrounding the print for example, the white fringe can be specified as the printing position. In the case where the same characters are printed on each print, the order information can be described as "good morning×5", as shown in FIG. 4, for example. In this case, the characters are input only once.

In the case where the image to be printed is a class photo including five persons and a print is distributed to each of the five persons, the order content in the order information C may specify "5" and the name of each person as the quantity and the characters respectively, as shown in FIG. 5.

The laboratory 2 receives the order information C by using the input/output means 7 (Step S15), and reads the high-resolution image data S from the database 5 based on the order content described in the order information C. The output means 8 then outputs the prints (Step S16), and the prints the characters on the back of the prints based on the character information (Step S17) to end the procedure.

Figure 6A:
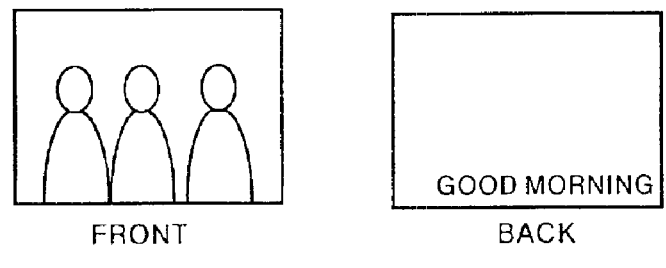
FIGS. 6A and 6B show examples of prints obtained in this embodiment.
Figure 6B:
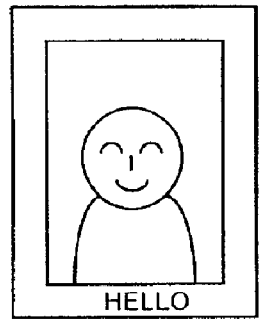

FIGS. 6(*a*) and 6(*b*) show examples of the prints generated by the printing system in this embodiment. As shown in FIG. 6(*a*), the word string "good morning" is printed on the back of each print. As shown in FIG. 6(*b*), the word "hello" can be printed on the white fringe in the case of the print having the white fringe.

As has been described above, in this embodiment, the desired characters are printed on the prints. Therefore, the user 1 can refresh a memory of the prints easily when looking at the prints later. In this manner, the prints can be managed easily.

By describing the character information in the order information C, the user 1 only has to input the characters in addition to the quantity and the like at the time of order information generation. Therefore, the character information can be generated efficiently. Meanwhile, the laboratory 2 knows the content of both the order and the character information by simply referring to the order information C. Therefore, printing can be carried out efficiently.

Furthermore, when the prints of the same image data S are generated, each print can have the name of a person by setting the character information to each print, such as in the case where each of the persons in the class photo obtains the print, for example. In this manner, the prints can be distributed easily.

Moreover, by connecting the personal computer 10 to the laboratory 2 via the network 3, the order information C can be transferred easily and printing can be carried out efficiently.

In the above embodiment, the character information is described in the order information, which is not limited to this example. For example, the character information may be transferred to the laboratory 2 in the form of text data separated from the order information.

In the above embodiment, the high-resolution image data S are stored in the database 5 of the laboratory 2. However, in the case where the user 1 has the high-resolution image data S, the image data S to be printed are transferred to the laboratory 2 together with the order information C. At this time, the character information may be added to the image data S as tag information thereof. Alternatively, the character information may be transferred to the laboratory 2 as text data, separately from the order information.

In the above embodiment, the order information C is transferred from the user 1 to the laboratory 2 via the network 3. However, the order information C may be recorded in a recording medium so that the user 1 can bring the recording medium to the laboratory 2.

In the above embodiment, the characters are printed on the back of the prints or on the white fringe. However, the characters may be printed on the image.

In the above embodiment, the characters desired by the user have been printed on the prints. However, a monochrome image or a simple image comprising only an outline (hereinafter called simple image), such as a simple pattern, a portrait of the user 1, and a mark for identifying the user 1, may be printed on the print. In this case, the user 1 generates the simple image to by printed on the print, or download the simple image from a server storing the simple image, by using the personal computer 10. Image information representing the simple image cannot be described in the order information C. Therefore, bit map data representing the simple image are transferred to the laboratory 2, separately from the order information C. In this case, information specifying the bit map data is described in the order information C. The simple image can be printed together with the character.

Figure 7A:
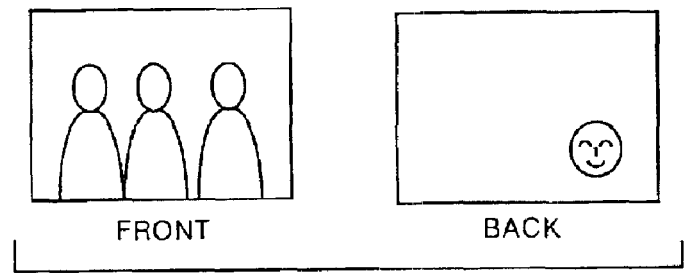
FIGS. 7A, 7B and 7C show prints obtained in this embodiment (example 2)
Figure 7B:
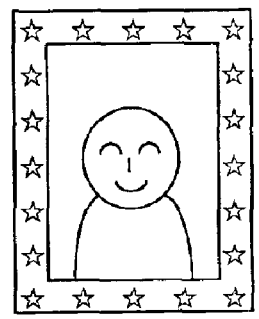
Figure 7C:
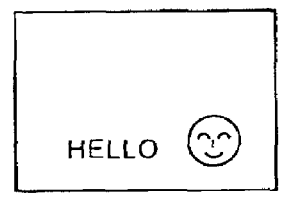

FIG. 7 shows examples of prints having the simple images printed thereon. As shown in FIG. 7A, a portrait of the user is printed on the back of the print, for example. Furthermore, as shown in FIG. 7B, in the case of a print having a white margin, a simple pattern can be printed on the margin. Moreover, as shown in FIG. 7C, a portrait of the user can be printed together with the characters on the back of the print.

Figure 8:
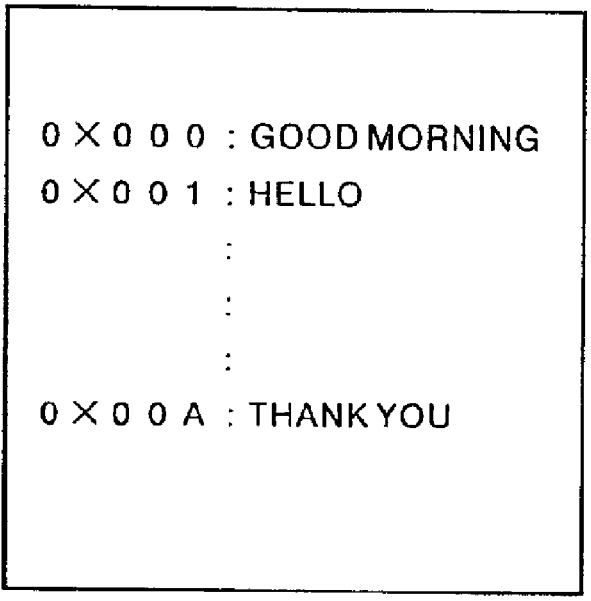
FIG. 8 shows a table (example 1)
Figure 9:
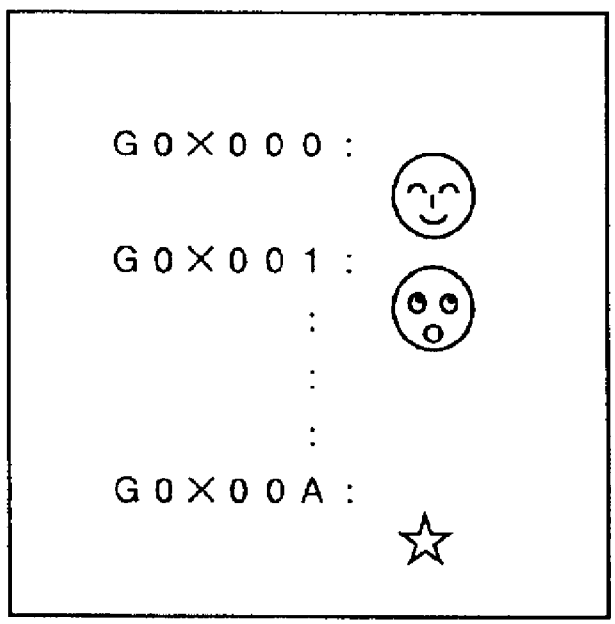
FIG. 9 shows a table (example 2)

In the above embodiment, the characters themselves are input so that the order information C describes the character information representing the characters that have been input. However, instead of the characters, code information comprising a number or an alphabet representing a kind of character string and a combination thereof may be input. In this case, the personal computer 10 and the laboratory 2 comprise storage means such as a memory and a hard disc storing a table representing a relationship between the code information and character strings corresponding to the code information, as shown in FIG. 8. Meanwhile, for the simple image, code information representing a type of simple image may also be input. In this case, the personal computer 10 and the laboratory 2 comprise storage means storing a table representing a relationship between the code information and simple images corresponding to the code information, as shown in FIG. 9.

When the user 1 generates the order information C, a desired one of the character strings and/or a desired one of the simple images are selected from the table or tables, and the code information corresponding to the selected character string and/or the selected simple image is input to the personal computer 10 to be described as the character information and/or simple image information in the order information C, as shown in FIG. 10. In FIG. 10, only the code information corresponding to the character string is described as the character information.

Meanwhile, the laboratory 2 prints the character string and/or the simple image corresponding to the code information at the predetermined position, based on the code information described in the order information C and the table stored in the laboratory 2.

As has been described above, by describing the characters and/or the simple image in the order information C by the using code information, the user 1 can easily input the desired characters and/or the desired simple image. Especially, by representing the simple image as the code information, the information representing the simple image can be included not only in the order information but also as tag information of the image data. Therefore, compared with the case of bit map data representing the simple image, the image information representing the simple image can be provided more easily to the laboratory 2.

In the case where a plurality of sets of the image data S are printed, it is preferable for the order information C to be descried so as to set the same character information item to all the prints, as shown in FIG. 11. In this manner, it becomes unnecessary to input the same character information item to be input for each of the prints and the character information can be generated efficiently.

In addition, all of the contents of Japanese Patent Application Nos. 2000-002608 and 2000-383857 are incorporated into this specification by reference.

What is claimed is:

1. A printing system comprising:
    a client having character image information generation means for generating character image information representing desired characters and/or a desired simple image by receiving an input of the character and/or the simple image, wherein the character image information generation means describes the character image information in order information representing the content of a printing order of the image data; and
    a laboratory server having information printing means for printing the character and/or the simple image at a predetermined position on a print based on the character image information provided from the client, at the time of printing image data, wherein the information printing means prints the character and/or the simple image at the predetermined position of the print based on the order information.

2. A printing system as defined in claim 1, wherein,
    in the case where the content of the printing order specifies generation of a plurality of prints of the same image data, the character image information generation means enables setting the character image information for each of the prints, and
    the information printing means prints the character and/or the simple image represented by the character image information set for each of the prints on the predetermined position of each of the prints.

3. A printing system as defined in claim 2, wherein the client and the laboratory server comprise storage means for storing a table relating a predetermined character and/or a predetermined simple image to code information representing a kind of the character and/or the simple image.

4. A printing system as defined in claim 2, wherein the client and the laboratory server are connected to each other via a network.

5. A printing system as defined in claim 1, wherein, in the case where the content of the printing order specifies printing of a plurality of sets of the image data, the character image information generating means enables setting one item of the character image information for all prints and the information printing means prints the character and/or the simple image represented by the character image information at the predetermined position of each of the prints.

6. A printing system as defined in claim 5, wherein the client and the laboratory server comprise storage means for storing a table relating a predetermined character and/or a predetermined simple image to code information representing a kind of the character and/or the simple image.

7. A printing system as defined in claim 5, wherein the client and the laboratory server are connected to each other via a network.

8. A printing system as defined in claim 1, wherein the client and the laboratory server comprise storage means for storing a table relating a predetermined character and/or a predetermined simple image to code information representing a kind of the character and/or the simple image.

9. A printing system as defined in claim 1, wherein the client and the laboratory server are connected to each other via a network.

10. A print order method comprising the steps of:
    generating character image information representing desired characters and/or a desired simple image by receiving an input of the character and/or the simple image; and
    printing the character and/or the simple image at a predetermined position of a print based on the character image information when image data are printed, wherein the character image information is described in order information representing the content of a printing order of the image data.

11. A print order method as defined in claim 9, wherein, in the case where the content of the printing order specifies generation of a plurality of prints of the same image data, the character image information is set for each of the prints.

12. A print order method as defined in claim 10, wherein, in the case where the content of the printing order specifies printing of a plurality of sets of the image data, one item of the character image information is set for all the prints.

13. A print order method as defined in claim 10, wherein the desired character and/or the desired simple image are input as code information representing a kind of a predetermined character and/or a predetermined simple image.

14. A print order apparatus used in the print order method defined in claim 10, the print order apparatus comprising:
    character image information generation means for generating the character image information representing the desired character and/or the desired simple image by receiving the input of the character and/or the simple image.

15. A printing apparatus used in the print order method defined in claim 10, the printing apparatus comprising:

information printing means for printing the character and/or the simple image at the predetermined position of the print based on the character image information when the image data are printed.

16. A computer-readable recording medium storing a program used in the print order method defined in claim 10, the program comprising the procedure of:

generating the character image information representing the desired character and/or the desired simple image by receiving the input of the character and/or the simple image.

17. A computer-readable recording medium storing a program used in the print order method defined in claim 10, the program comprising the procedure of:

printing the character and/or the simple image at the predetermined position of the print based on the character image information when the image data are printed.

18. A printing system comprising:

a client terminal device having a character image information generation device for generating character image information representing desired characters and/or a desired simple image by receiving an input of the character and/or the simple image, wherein the character image information generation device describes the character image information in order information representing the content of a printing order of the image data; and a laboratory server having an information printing device for printing the character and/or the simple image at a predetermined position on a print based on the character image information provided from the client terminal device, at the time of printing image data, wherein the information printing device prints the character and/or the simple image at the predetermined position of the print based on the order information.

19. A printing system as defined in claim 18, wherein the client and the laboratory server are connected to each other via a network.

20. The printing system as defined in claim 18, wherein the character image information is provided to the laboratory server via a network or is recorded in a recording medium.

21. The printing system as defined in claim 18, wherein the order information includes at least one of a processing number indicating a content of a print service, an image number specifying a photograph, a print size, a quantity of prints, a quality of printing paper, a thickness of the paper, a content of a photographic processing, and a trimming specification.

22. The printing system as defined in claim 18, wherein the desired characters include at least one of a user-designated character for printing on a print when the user requests printing of the image data from the laboratory, a character and a character string.

23. The printing system as defined in claim 18, wherein the desired simple image is an image a user wishes to print on a print at the time of requesting printing of the image data from the laboratory server.

24. The printing system as defined in claim 18, wherein, in the case where the content of the printing order specifies generation of a plurality of print of the same image data, the character image information generation device enables setting the character image information for each of the prints, and the information printing device prints the character and/or the simple image represented by the character image information set for each of the prints on the predetermiend position of each of the prints.

25. The printing system as defined in claim 18, wherein, in the case where the content of the printing order specifies printing of a plurality of sets of the image data, the character image information generating device enables setting one item of the character image information for all prints and the information printing device prints the character and/or the simple image represented by the character image information at the predetermined position of each of the prints.

26. A printing system as defined in claim 18, wherein the client terminal device and the laboratory server comprise a storage device for storing a table relating a predetermined character and/or a predetermined simple image to code information representing a kind of the character and/or the simple image.

* * * * *